US008122340B2

(12) United States Patent (10) Patent No.: US 8,122,340 B2
Tow et al. (45) Date of Patent: Feb. 21, 2012

(54) SYSTEM AND METHOD FOR MANAGEMENT OF COMMON DECENTRALIZED APPLICATIONS DATA AND LOGIC

(76) Inventors: Bruce Tow, San Francisco, CA (US); Neil Savasta, Tiburon, CA (US)

( * ) Notice: Subject to any disclaimer, the term of this patent is extended or adjusted under 35 U.S.C. 154(b) by 398 days.

(21) Appl. No.: 12/552,847

(22) Filed: Sep. 2, 2009

(65) Prior Publication Data

US 2010/0083085 A1 Apr. 1, 2010

Related U.S. Application Data

(60) Provisional application No. 61/101,141, filed on Sep. 29, 2008.

(51) Int. Cl.
*G06F 17/21* (2006.01)
(52) U.S. Cl. ..................................... 715/227
(58) Field of Classification Search ............... 715/227
See application file for complete search history.

(56) References Cited

U.S. PATENT DOCUMENTS

| | | | |
|---|---|---|---|
| 2008/0140679 A1* | 6/2008 | Deyo et al. ............ | 707/100 |
| 2008/0208830 A1* | 8/2008 | Lauckhart et al. ......... | 707/4 |
| 2008/0270381 A1* | 10/2008 | Thomsen .................. | 707/5 |
| 2009/0063470 A1* | 3/2009 | Peled et al. ............... | 707/5 |
| 2009/0112841 A1* | 4/2009 | Devarakonda et al. ...... | 707/5 |
| 2009/0150169 A1* | 6/2009 | Kirkwood et al. .......... | 705/1 |
| 2009/0248619 A1* | 10/2009 | Das et al. ................. | 707/2 |
| 2009/0265313 A1* | 10/2009 | Wang ....................... | 707/3 |

OTHER PUBLICATIONS

Roth et al., Information Integration: A New Generation of Information Technology, IBM, IBM Systems Journal vol. 41 No. 4, 2002, p. 563-577.*

* cited by examiner

*Primary Examiner* — Laurie Ries
*Assistant Examiner* — Frank D Mills
(74) *Attorney, Agent, or Firm* — ARC IP Law, PC; Joseph J. Mayo

(57) ABSTRACT

Enables a computer-assisted management of enterprise-network files of interest, and trouble-free migration of enterprise-wide business data and processes currently built and maintained in two popular tools, spreadsheets (commonly MICROSOFT® EXCEL®) and desktop/departmental databases (commonly MICROSOFT® ACCESS®). Includes:
  File-system repository that lists each file of interest and describes in detail design and intent information for each spreadsheet and desktop/departmental database;
  Utilities that keep the file-system repository complete and up to date;
  Simplified Enterprise Application Repository (SEAR) configured to store descriptions of simple "enterprise" applications;
  Repository Application that manage both the file-system repository and SEAR;
  Utilities that read enterprise database meta-data (such as table definitions) and store them in SEAR;
  Utilities that analyze spreadsheets and desktop/departmental databases in the file repository and restate them as simple "enterprise" applications in SEAR;
  Utilities that generate well-documented and well-programmed enterprise relational databases and applications from simple "enterprise" applications descriptions in SEAR.

20 Claims, 19 Drawing Sheets

Figure 5A

Table groups

| Group | Description |
|---|---|
| File-System | The File-System contains tables that represent basic information (such as location, name, size, date-last-modified, et cetera) and file-owner-supplied "annotations" about enterprise file-system files of interest, including spreadsheets, desktop/departmental databases, and other files of interest such as MP3s. |
| Spreadsheet Meta-Model | The Spreadsheet Meta-Model contains tables that describe details about each spreadsheet, such as worksheet, column, row, cell, macro, et cetera definitions. |
| Database Meta-Model | The Database Meta-Model contains tables that describe details about each desktop/departmental database, such as table, column, query, transaction, report, et cetera definitions. |
| Enterprise Applications Meta-Meta-Model | The Enterprise Applications Meta-Meta-Model contains tables that describe a simplified and "portable" (i.e., to multiple different applications-development technology stacks) enterprise application's user interfaces, reports, business logic, external interfaces, et cetera. |
| Enterprise/Reference Model | The Enterprise/Reference Model contains tables describing the enterprise's organization structure (to help determine file ownership) and staff members (employees and others). |

File-System tables

| Table | Description |
|---|---|
| FileObject | FileObject lists miscellaneous file-system objects (in a 1-to-1 correspondence with all other file-system tables). |
| FileObjectEvent | FileObjectEvent lists history and other events affecting file-system objects. |
| FileObjectMiscellaneousDetail | FileObjectMiscellaneousDetail lists miscellaneous details about file-system objects. |
| FileObjectNote | FileObjectNote lists free-form and specific-purpose notes and annotations, et cetera about file-system objects. |
| FileObjectOwnership | FileObjectOwnership lists ownership or other roles of staff members regarding file-system objects. |
| FileObjectRelationship | FileObjectRelationship lists relationships between file-system objects (like between a server and its disks). |
| Organization | Organization lists companies, divisions, et cetera. |
| OrganizationRelationship | OrganizationRelationship lists relationships between organizations (like parent-organization to child-organization). |
| StaffMember | StaffMember lists staff members within organizations. |
| StaffMemberResponsibility | StaffMemberResponsibility lists responsibilities held by staff members within an organization and its activities. |

Figure 5B

| Column | Description |
| --- | --- |
| FileObjectID | Sequenced, system-generated number |
| PrimaryParentFileObjectID | Pick the parent file object |
| Name | Enter the name |
| FileObjectTypeCode | Pick the file-object type |
| PrivateFlag | Check Yes to mark this file object private (i.e., do not track). |
| ExpectedMonthsLifetime | Enter the quantity |
| Description | Enter the description |
| ObjectBinary | Insert the file object's finary value, if a file |
| FileObjectStatusCode | Pick the file-object status |
| FileObjectCreationDateTime | Enter the date and time the file was created |
| FileObjectLastModifiedDateTime | Enter the date and time the file was last modified or changed |
| FileObjectLastAccessedDateTime | Enter the date and time the file was last accessed |
| SizeInBytes | Enter the size of the file or other object in bytes |
| ChecksumValue | Enter the binary-file's checksum |
| PrimaryOwnerID | Pick the staff member |
| PrimaryOwningOrganizationID | Pick the organization |
| OwnershipStatusCode | Pick the ownership status |
| LastOwnershipChangeDate | Enter the event date |
| ServerID | Pick the server containing this object (null if the current file object is itself a server) |
| DiskID | Pick the disk containing this object (null if the current object is itself a server or disk) |
| DirectoryTree | Enter the full directory tree for this file object |
| ActualStartDateTime | The start date time for this table as it uses ActualTimeRelation |
| ActualEndDateTime | The end date time for this table as it uses ActualTimeRelation |
| CreationDateTime | The date and time that this instance was created |
| CreatedBy | The end-user who created this instance |
| LastUpdateDateTime | The date and time that this instance was last updated |
| LastUpdatedBy | The end-user who last updated this instance |
| LastUpdatingProcess | The name of the transaction, TaskEngine, et cetera that last updated this instance |

Figure 5C

| Table | Description |
|---|---|
| SpreadsheetObject | SpreadsheetObject lists all spreadsheet-related semantic objects, in a 1-to-1 relationship between it and tables representing those other objects (like worksheets or cells). |
| SpreadsheetObjectEvent | SpreadsheetObjectEvent lists history and other events affecting spreadsheets. |
| SpreadsheetObjectMiscellaneousDetail | SpreadsheetObjectMiscellaneousDetail lists miscellaneous details about spreadsheet objects. |
| SpreadsheetObjectNote | SpreadsheetObjectNote lists freeform and structured notes, annotations, et cetera regarding spreadsheet objects. |
| Workbook | Workbook lists Excel spreadsheet workbooks (.xls files). |
| Worksheet | Worksheet lists worksheets within an Excel workbook. |
| WorksheetCell | WorksheetCell lists individual cells or cell-ranges in a worksheet. |
| WorksheetCellDetail | WorksheetCellDetail lists details of worksheet cells. |
| WorksheetCellRelationship | WorksheetCellRelationship lists (typically calculation-related) relationships between cells (for example, if A2's formula is "=A1*2" then there is a Calculation. Relationship between A1 and A2). |
| WorksheetChart | WorksheetChart lists charts displayed on worksheets. |
| WorksheetChartDetail | WorksheetChartDetail lists first-level details of charts. |
| WorksheetChartSubDetail | WorksheetChartSubDetail lists second-level details of charts. |
| WorksheetChartSubType | WorksheetChartSubType lists types of chart variations within each basic type list Bar. |
| WorksheetColumn | WorksheetColumn lists and describes attributes of worksheet columns. |
| WorksheetColumnDetail | WorksheetColumnDetail lists various details of column definitions. |
| WorksheetHeaderFooter | WorksheetHeaderFooter lists header and footer details for a worksheet. |
| WorksheetMacro | WorksheetMacro lists macros in a worksheet. |
| WorksheetMacroDetail | WorksheetMacroDetail lists various details of macros. |
| WorksheetPicture | WorksheetPicture lists pictures or other graphics displayed on worksheets. |
| WorksheetRow | WorksheetRow lists and describes attributes of worksheet rows. |
| WorksheetRowDetail | WorksheetRowDetail lists various details of row definitions. |

Figure 5D

| Table | Description |
|---|---|
| AccessButton | AccessButton lists buttons on Access forms or queries. |
| AccessButtonDetail | AccessButtonDetail lists details of buttons. |
| AccessCalledFunction | AccessCalledFunction lists functions called by an Access form. |
| AccessCalledFunctionParameter | AccessCalledFunctionParameter lists parameters for an Access-called function. |
| AccessCheckbox | AccessCheckbox lists checkboxes on Access forms or queries. |
| AccessColumn | AccessColumn lists table columns. |
| AccessConditionalFormat | AccessConditionalFormat lists conditional format rules on Access forms or queries. |
| AccessConditionalFormatDetail | AccessConditionalFormatDetail lists details of Access conditional formats. |
| AccessDatabase | AccessDatabase lists Access databases (i.e., collections of tables, et cetera). |
| AccessDefaultValue | AccessDefaultValue lists field default values on Access forms or queries. |
| AccessDefaultValueDetail | AccessDefaultValueDetail lists details of default-value definitions. |
| AccessDropdown | AccessDropdown lists dropdown boxes on Access forms or queries. |
| AccessDropdownDetail | AccessDropdownDetail lists details of dropdown boxes. |
| AccessEvent | AccessEvent lists history of events affecting Access objects. |
| AccessForeignKey | AccessForeignKey lists foreign keys between tables. |
| AccessForeignKeyColumn | AccessForeignKeyColumn lists matching columns within foreign keys. |
| AccessFormOrQuery | AccessFormOrQuery lists forms and queries defined in an Access database. |
| AccessFormOrQueryDetail | AccessFormOrQueryDetail lists highest-level details of Access forms or queries. |
| AccessFormOrQueryField | AccessFormOrQueryField lists enterable and display-only fields displayed on Access forms or queries. |
| AccessFormOrQueryFieldDetail | AccessFormFieldDetail lists details of displayed fields. |
| AccessFormOrQueryRegion | AccessFormOrQueryRegion lists display regions on Access forms or queries. |
| AccessFormOrQueryRegionDetail | AccessFormOrQueryRegionDetail lists details of display regions. |
| AccessFormOrQueryTab | AccessFormOrQueryTab lists visual-display tabs on Access forms or queries. |
| AccessFormOrQueryTabDetail | AccessFormOrQueryTabDetail lists details of visual-display tabs. |
| AccessKey | AccessKey lists unique and non-unique keys for rapid or unique querying of Access database tables. |
| AccessKeyColumn | AccessKeyColumn lists sequential-order columns in table keys. |
| AccessLookup | AccessLookup lists validation lookups on Access forms or queries. |
| AccessLookupValue | AccessLookupValue lists valid-value details of validation lookups. |

Figure 5E

| Table | Description |
|---|---|
| AccessMiscellaneousDetail | AccessMiscellaneousDetail lists miscellaneous details on any Access object. |
| AccessNamedRange | AccessNamedRange lists named ranges in Access databases. |
| AccessNote | AccessNote lists free-form notes, by type, describing any Access object. |
| AccessObject | AccessObject lists all high- and low-level Access objects, such as tables, forms, fields, et cetera. |
| AccessQuerySearch | AccessQuerySearch lists searches on Access queries. |
| AccessQuerySearchDetail | AccessQuerySearchDetail lists details of Access-query searches. |
| AccessRadioButton | AccessRadioButton lists radio buttons displayed as part of radio buttons. |
| AccessRadioGroup | AccessRadioGroup lists radio buttons displayed on Access forms or queries. |
| AccessReport | AccessReport lists reports you can run on Access. |
| AccessReportField | AccessReportField lists fields displayed on Access reports. |
| AccessReportFieldDetail | AccessReportFieldDetail lists details of Access-report displayed fields. |
| AccessReportHeaderFooter | AccessReportHeaderFooter lists header and footer details on Access reports. |
| AccessReportRegion | AccessReportRegion lists display regions on Access reports. |
| AccessReportRegionDetail | AccessReportRegionDetail lists details of Access-report display regions. |
| AccessReportRunTimeOption | AccessReportRunTimeOption lists run-time options that control output on Access reports. |
| AccessReportRunTimeOptionDetail | AccessReportRunTimeOptionDetail lists details of Access-report run-time options. |
| AccessReportSection | AccessReportSection lists sort-controlling sections on Access reports. |
| AccessReportSectionDetail | AccessReportSectionDetail lists details of Access-report sort-controlling sections. |
| AccessReportSummary | AccessReportSummary lists summaries defined Access reports. |
| AccessReportSummaryDetail | AccessReportSummaryDetail lists details of Access-report summaries. |
| AccessRowColumnValue | AccessColumnValue lists values for access columns for specific rows. |
| AccessTable | AccessTable lists tables defined in an Access database. |
| AccessTableSequence | AccessTableSequence lists unique-value-driving sequences for Access tables. |
| AccessValidationRule | AccessValidationRule lists field(s) validation rules on Access forms or queries. |
| AccessValidationRuleDetail | AccessValidationRuleDetail lists details of field(s) validation rules. |

Figure 5F

| Table | Description |
|---|---|
| DataObject | DataObject lists entities, objects, tables, views, attributes, columns, and all other things that are singular or collective data. |
| DataObjectAccess | DataObjectAccess lists means of accessing data objects, like unique, non-unique, and foreign keys. |
| DataObjectAccessDetail | DataObjectAccessDetail lists details of data-object accesses. |
| DataObjectRelationship | DataObjectRelationship lists 1-to-many and many-to-many relationships between data objects (like from parent entities to/from child entities). |
| EnterpriseApplication | EnterpriseApplication lists applications (collections of data, screens, reports, et cetera). |
| EnterpriseApplicationObject | EnterpriseApplicationObject lists all applications objects (meta-meta-model repository for any table in this group with a 1-to-1 relationship to that other table). |
| EnterpriseApplicationObject Event | EnterpriseApplicationObjectEvent lists history and other events affecting an enterprise-applications object. |
| EnterpriseApplicationObject MiscellaneousDetail | EnterpriseApplicationObjectMiscellaneousDetail lists non-object-type specific details for any applications object. |
| EnterpriseApplicationObject Note | EnterpriseApplicationObjectNote lists notes/annotations/commentary/et cetera about any applications object. |
| EnterpriseDatabaseInstance | EnterpriseDatabaseInstance lists RDBMS database instances (groups of schemas) in an enterprise database. |
| EnterpriseDomain | EnterpriseDomain lists column-format and column-value domains in an enterprise database. |
| EnterpriseForeignKey | EnterpriseForeignKey lists table foreign keys. |
| EnterpriseForeignKeyColumn | EnterpriseForeignKeyColumn lists columns that make up table foreign keys. |
| EnterpriseIndex | EnterpriseIndex lists table indexes (unique and non-unique). |
| EnterpriseIndexColumn | EnterpriseIndexColumn lists sequenced-order columns in each index. |
| EnterpriseRelation | EnterpriseRelation lists tables and views in an enterprise database. |
| EnterpriseRelationColumn | EnterpriseRelationColumn lists columns within each relation (i.e., table or view). |
| EnterpriseSchema | EnterpriseSchema lists schemas (collections of tables) in an enterprise database. |
| FunctionObject | FunctionObject lists enterprise-applications objects that perform non-user-interfacing functions. |
| FunctionObjectInvocation | FunctionObjectInvocation lists places that enterprise-applications objects, including other function objects, call or invoke function objects. |
| FunctionObjectInvocation Parameter | FunctionObjectInvocationParameter lists run-time parameters passed when calling function objects. |
| FunctionObjectParameter | FunctionObjectParameter lists parameters by which you call function objects. |
| InterfaceObject | InterfaceObject lists on-line transactions, imports, exports, reports, et cetera that interface an enterprise application with the outside world. |
| InterfaceObjectRelationship | InterfaceObjectRelationship lists relationships between interface objects (like screens to tabs or regions on those screens). |
| MenuObject | MenuObject lists menu-describing objects like menus or responsibilities/roles). |
| MenuObjectDetail | MenuObjectDetail lists details (like menu entries) regarding menu-describing objects. |

Figure 5G

| Table | Description |
|---|---|
| Organization | Organization lists companies, divisions, et cetera. |
| OrganizationRelationship | OrganizationRelationship lists relationships between organizations (like parent-organization to child-organization). |
| StaffMember | StaffMember lists staff members within organizations. |
| StaffMemberResponsibility | StaffMemberResponsibility lists responsibilities held by staff members within an organization and its activities. |

SYSTEM AND METHOD FOR MANAGEMENT OF COMMON DECENTRALIZED APPLICATIONS DATA AND LOGIC

This application claims the benefit of U.S. Provisional Patent Application 61/101,141 filed 29 Sep. 2008, the specification of which is hereby incorporated herein by reference.

BACKGROUND OF THE INVENTION

1. Field of the Invention

One or more embodiments of the invention are related to the field of computer systems. More particularly, but not by way of limitation, one or more embodiments of the invention enable a system and method for management of common decentralized applications data and logic.

2. Description of the Related Art

There is currently no known system or method for computer-assisted management of common decentralized applications data and logic, for example enterprise-network files of interest which contain enterprise-wide business data, but which are housed in individual files spread across an organization.

Specifically, enterprise-wide business data and processes are currently built and maintained in two popular tools, spreadsheets, most commonly MICROSOFT® EXCEL®), and desktop/departmental databases, most commonly MICROSOFT® ACCESS®. Files of these types litter business organization personal computers and yet should be coordinated to provide data integrity and centralized knowledge. This dispersed information topology limits the usefulness of the data.

Enterprise Chief Information Officers (CIOs) and other IT-department managers often are held responsible for knowing how many files exist of certain file types (for example, MP3s and proprietary-software executables). This is a difficult job at best as the files could be in thousands of directories spread across thousands of personal computers in a large organization.

In addition, both spreadsheets, such as MICROSOFT® EXCEL® and desktop/departmental databases such as MICROSOFT® ACCESS® offer daunting challenges to most enterprises' CIOs or IT departments, as they are usually:

Difficult to inventory and understand—Most spreadsheets and desktop/departmental databases are designed, built, and maintained by business (i.e., non-Information Technology) departments, with no IT involvement or guidance. Thus, most CIOs or IT managers cannot answer with any confidence any question about the number or purpose of the spreadsheets and desktop/departmental databases—even though these usually comprise a substantive percentage of overall enterprise "information."

Very difficult to migrate into enterprise applications—After business departments develop and use spreadsheets and desktop/departmental databases, business department management occasionally finds inherent spreadsheet and desktop/departmental database limitations (primarily to do with single-user limits or lack of integration with other enterprise databases) to be a problem, and ask their CIO or IT manager to "upgrade" it to support multiple users and, where appropriate, integrate it with other enterprise applications and data. This is often a troublesome request for a CIO or IT manager to receive, as most CIO's resources are stretched thin and the effort of migrating either a spreadsheet or desktop/departmental database to fit it into enterprise database and architectural standards (such application-development technology stacks such as .NET/SQL Server or J2EE/Oracle) often significantly exceeds the cost of designing and building the original spreadsheet or desktop/departmental database.

For at least the limitations described above there is a need for a system and method for management of common decentralized applications data and logic.

BRIEF SUMMARY OF THE INVENTION

One or more embodiments of the invention enable a new system and method for management of common decentralized applications data and logic. Specifically, embodiments of the invention enable a computer-assisted management of enterprise-network files of interest, and trouble-free migration of enterprise-wide business data and processes currently built and maintained in two popular tools, spreadsheets (most commonly MICROSOFT® EXCEL®) and desktop/departmental databases (most commonly MICROSOFT® ACCESS®).

Embodiments of the invention solve the problems outlined in the description of the related art by a system and method that includes:

A file-system repository that lists each file of interest and in addition describes in detail design and intent information for each spreadsheet and desktop/departmental database.

Utilities that keep the file-system repository complete and up to date.

A Simplified Enterprise Application Repository (SEAR), (also referred to herein as the Simplified Enterprise Application Meta-Model) configured to store descriptions of simple "enterprise" applications.

A Repository Application that manage both the file-system repository and the SEAR.

Utilities that read enterprise database meta-data (such as table definitions) and store them into the SEAR.

Utilities that analyze spreadsheets and desktop/departmental databases, or files of any other type, for example as associated with given file-type extensions, in the file repository and restate them as simple "enterprise" applications in the SEAR. Other file types include MP3's, or files of any other extension.

Utilities that generate well-documented and well-programmed enterprise relational databases and applications from simple "enterprise" applications descriptions in the SEAR.

BRIEF DESCRIPTION OF THE DRAWINGS

The above and other aspects, features and advantages of the invention will be more apparent from the following more particular description thereof, presented in conjunction with the following drawings wherein:

FIGS. 5A-5G illustrate comprehensive repository groups, tables, and key-table column designs (split into seven figures)

DETAILED DESCRIPTION OF THE INVENTION

A system and method for management of common decentralized applications data and logic will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
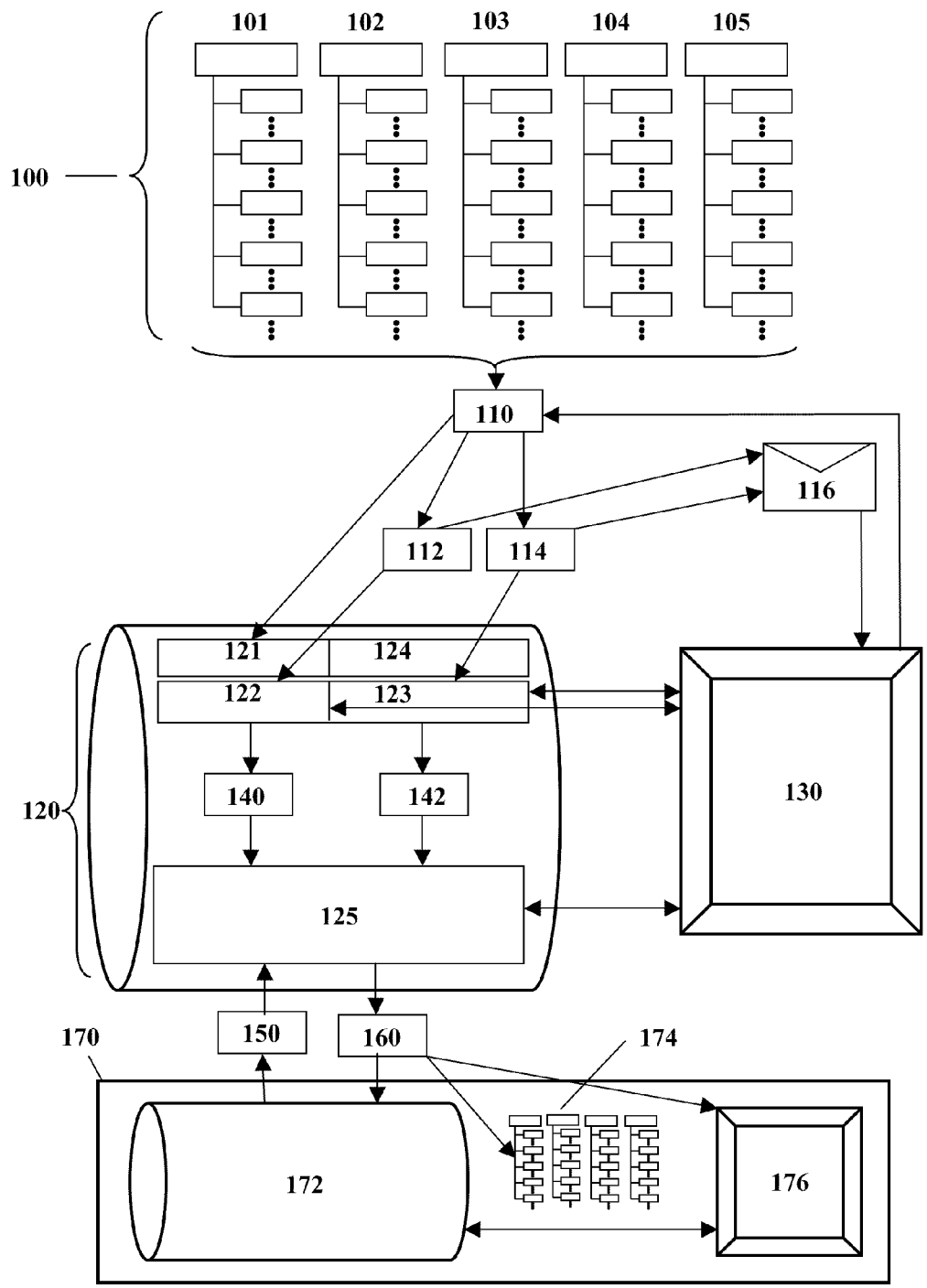
FIG. 1 illustrates the architecture of the system.

FIG. 1 illustrates the architecture of the system which includes:

Enterprise Network (100) that contains computers, e.g., mainframes (101), servers (102), desktops (103), laptops (104), and other file-containing computers (105), with various files of interest including spreadsheets and desktop/departmental databases, wherein the computers record basic file information such as date-time last modified, size, et cetera in the file-system repository (121).

"Crawler" (110) utility periodically searches network directories and files for new, changed, or deleted/erased files of interest including, but not limited to, spreadsheets and desktop/departmental database files. Crawler (110) passes new, changed, or erased spreadsheets to Spreadsheet Analyzer (112) utility, which reads spreadsheet semantic details (such as worksheets, cell definitions, macros, et cetera), and stores changes into Spreadsheet Meta-Model (122) database (part of Comprehensive Repository (120) relational database). If the spreadsheet file is new, Crawler 110 sends e-mail (116) to the best-guess file owner asking for more information about the new spreadsheet/file's purpose, history, et cetera.

The Crawler (110) utility passes new, changed, or erased desktop/departmental databases and optionally their database data to Database Analyzer (114) utility, which reads desktop/departmental database semantic details (such as tables, queries, forms, reports, et cetera), stores changes into Database Meta-Model (123) database (which also is part of Comprehensive Repository (120) relational database), and if the desktop/departmental database file is new, sends e-mail (116) to the best-guess file owner asking for more information about the new database/file's purpose, history, et cetera.

A Repository Application (130) is used by the CIO and other authorized IT staff to manage the run frequency and network reach of the Crawler (110) utility; to read, analyze, report on, and add value to ("annotate") information in the file-system repository (121), Spreadsheet Meta-Model (122) the Database Meta-Model (123), the Enterprise/Reference Model (124), and the Enterprise Simplified Enterprise Application Meta-Model (125) database.

When an end-user opens an e-mail (116) generated by either the Spreadsheet Analyzer utility (112) or the Database Analyzer utility (114), the end-user clicks a link in the e-mail's body to add purpose and other "annotation" information, forward the request to another person who is the file's owner, or claim the file is private. In each case, clicking the link automatically invokes the Repository Application (130) for a purpose-specific on-line transaction to do the action requested.

An Enterprise Database Upload (150) utility periodically searches the Enterprise Development Database (172) structure (part of the Centrally Managed Enterprise Architecture (170)) for created, modified, or dropped tables and other relational-database objects, and stores changes into a Simplified Enterprise Simplified Enterprise Application Meta-Model (125) database, which also is part of the Comprehensive Repository (120) relational database.

A Spreadsheet Synthesis (140) utility reads the Spreadsheet Meta-Model (122) database, determines (helped by Repository-Application (130) "annotations" as necessary) each spreadsheet's equivalent applications semantic (or meaning), and saves or updates that meaning (as an enhanced spreadsheet "applications" definition) in the Simplified Enterprise Simplified Enterprise Application Meta-Model (125) database. Where appropriate, the enhanced spreadsheet "application" definition reflects if it maintains its own data or, also, already existing enterprise data (i.e., that which has been analyzed and stored by the Enterprise Database Upload (150) utility).

A Database Synthesis (142) utility reads the Database Meta-Model (123) database, determines (helped by Repository-Application (130) "annotations" as necessary) each desktop/departmental database's equivalent applications semantic (or meaning), and saves or updates that meaning (as an enhanced desktop/departmental database "applications" definition) in the Simplified Enterprise Simplified Enterprise Application Meta-Model (125) database. Where appropriate, the enhanced desktop/departmental database "application" definition reflects if it maintains its own data or, also, already existing enterprise data (i.e., that which has been analyzed and stored by the Enterprise Database Upload (150) utility).

An Enterprise Applications Generator (160) utility reads the Simplified Enterprise Simplified Enterprise Application Meta-Model (125) database (including "annotations" where applicable) and generates RDBMS (Relational Database Management System) DDL (Data-Definition Language, used to create, alter, and drop tables, et cetera) and DML (Data-Manipulation Language, used to insert, modify, and erase applications data), in the enterprise's preferred RDBMS environment (such as Oracle or SQL Server) to extend the Enterprise Database (172). The Enterprise Applications Generator (160) utility also generates well-documented applications logic ("code"), compiles that code, and deploys appropriate applications modules into the enterprise's Applications Logic Files (174) and Development Applications Tools (176) (both part of the Centrally Managed Enterprise Architecture (170)) in the enterprise's preferred applications technology (such as .NET and J2EE).

The Repository Application (130) also is used by the CIO, file owners, line-of-business managers, and other authorized staff to read, analyze, report on, and add value to ("annotate") information in the Simplified Enterprise Simplified Enterprise Application Meta-Model (125) database, and on demand to run the Spreadsheet Synthesis (140) utility, the Database Synthesis (142) utility, the Enterprise Database Upload (150) utility, and the Enterprise Applications Generator (160) utility. Crawler 110, spreadsheet analyzer 112, database analyzer 114, spreadsheet synthesis utility 140, database synthesis utility 142, Enterprise database upload utility 150, enterprise application generator 160, repository application 130, development application tools 176 can run on any computer 101, 102, 103, 104 and/or 105 in Enterprise Network 100, or in any other computer that can couple with Enterprise Network 100 as long as the computer is configured with enough memory and with sufficient processing power and network bandwidth to run these computational entities. In one or more embodiments of the invention, these computational entities may run on a plurality of computers selected from Enterprise Network 100, or from a plurality of computers that may be coupled with Enterprise Network 100, or any combination thereof. In addition, all of the databases or data storage elements shown in FIG. 1 including the file system repository 121, enterprise data model 124, spreadsheet meta model 122, database meta model 123, Simplified Enterprise Application Meta-Model 125, Enterprise Development database 172, and Enterprise Application Files 174 may be implemented with any memory element capable of storing and retrieving information, including but not limited to a file system or database or any other element so configured. One skilled in the art will recognize that memory storage elements that host these elements may be coupled with any computer in Enterprise Network 100, or coupled with any computer that may itself be coupled with Enterprise Network 100 for example.

Figure 2:
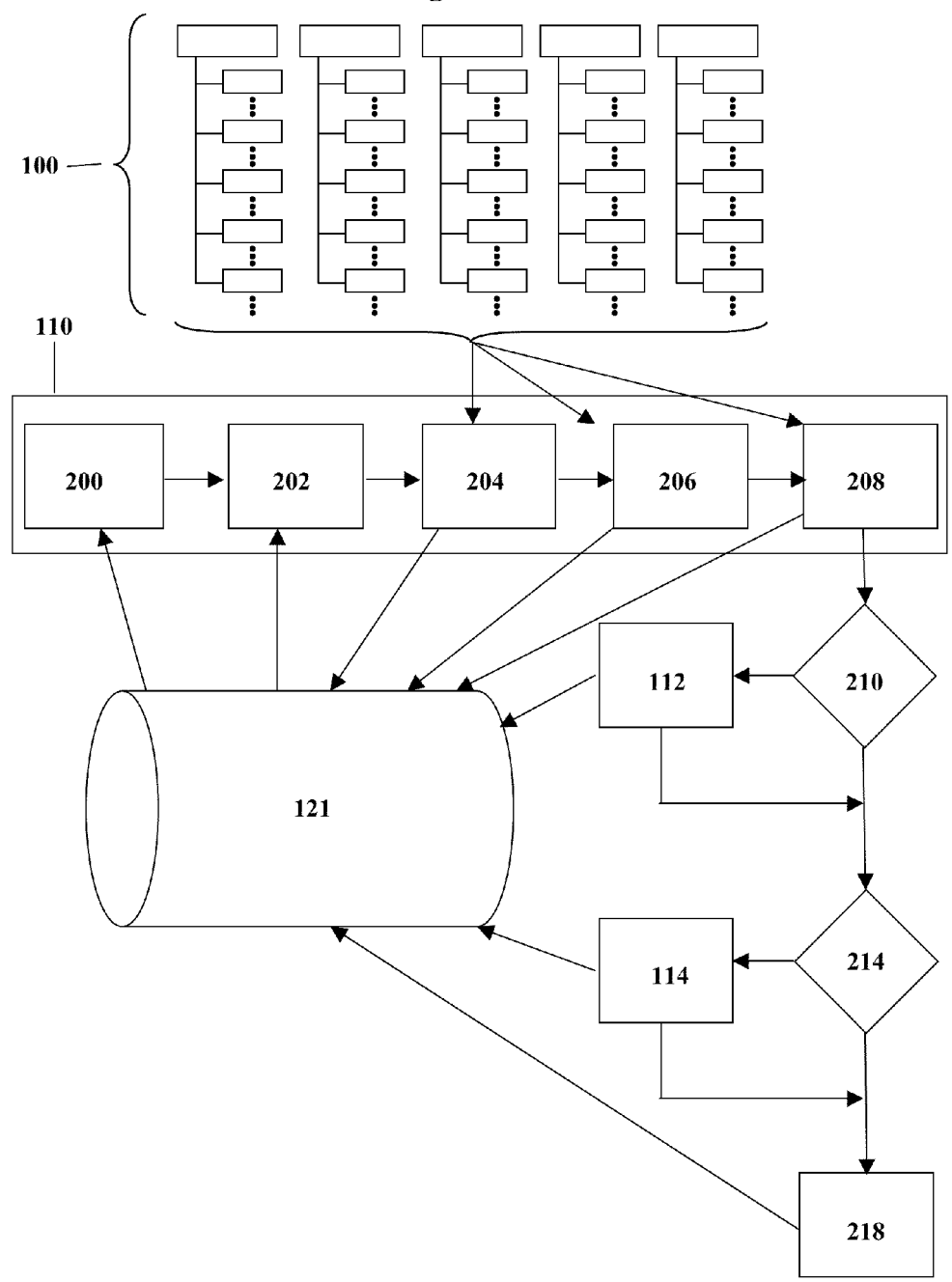
FIG. 2 illustrates logic flow for the Crawler utility.

FIG. 2 illustrates the logic flow of the Crawler utility:

An Enterprise Network (100) contains computers with various files of interesting including spreadsheets and desktop/departmental databases, also see FIG. 1 for more detail.

The Crawler utility initiation module (200) reads from the file-system repository (121) the list of file extensions (such as .xls, .xlsx, et cetera) to find databases and spreadsheets of interest associated with these file extensions.

The Crawler utility scope module (202) reads from the file-system repository (121) the list of domains, servers, disks, and directories (and their current known owners) to search and the list of already known files of interest with their previously found last-modify dates and times, sizes, checksums (CRCs), et cetera.

The Crawler utility initial-match module (204) verifies continued existence of each to-be-searched domain, server, and disk (100), and flags in the file-system repository (121) any it cannot find or search.

The Crawler utility directory-search module (206) finds all directories and sub-directories in in-scope domains, servers, and disks (100); compares it to previously found directories and sub-directories; adds new directory and subdirectory records to the file-system repository (121) (inheriting owner from parent directories, disks, et cetera); and marks in the file-system repository (121), as no longer there, any missing (but expected) directories and sub-directories.

The Crawler utility file-search module (208) finds all files of interest in found directories and sub-directories (100); compares each to previously found directories files (including last-modify date and time, size, CRC, et cetera); adds new file records to the file-system repository (121) (inheriting owner from parent directory, disk, et cetera); updates the file-system repository (121) where last-modify date and time, size, or CRC do not match, and marks in the file-system repository (121), as no longer there, any missing (but expected) files of interest. If a file of interest is new or changed and is either a spreadsheet or desktop/departmental database, the file-search module (208) reads its content into memory for passing to the next step (210).

Figure 3:
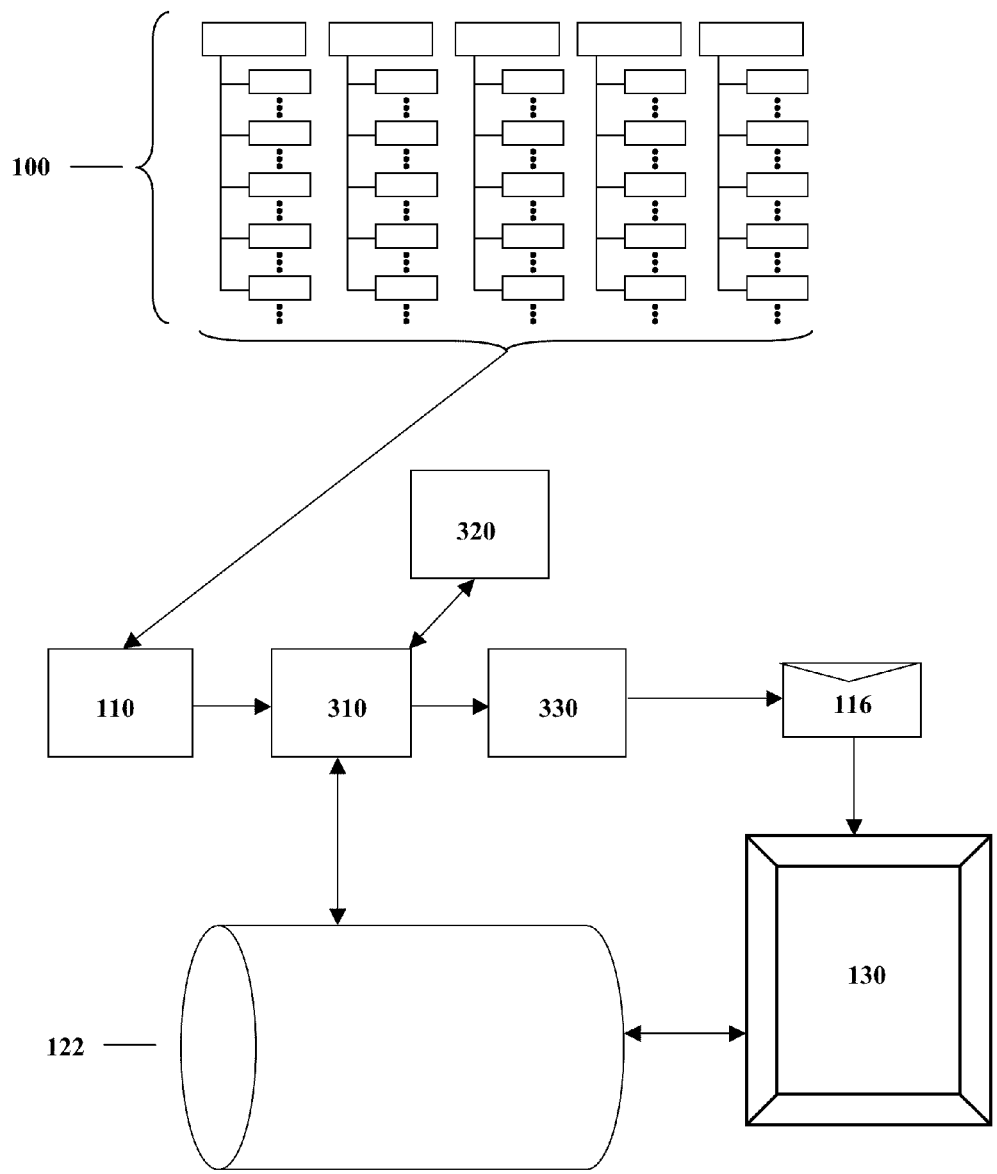
FIG. 3 illustrates logic flow for the Spreadsheet Analyzer utility.

If a new or changed file is a spreadsheet, the Crawler utility spreadsheet-file match module (210) passes it to the Spreadsheet Analyzer (112) utility (see FIG. 3 for details).

If a new or changed file is a desktop/departmental database, the Crawler utility database-file match module (214) passes it to the Database Analyzer (114) utility (see FIG. 3 for details).

The Crawler utility completion module (218) updates the file-system repository (121) with a record of its successful completion.

FIG. 3 illustrates the logic flow of the Spreadsheet Analyzer utility:

An Enterprise Network (100) contains computers with various files of interest including spreadsheets.

The "Crawler" (110) utility periodically searches network directories and files for new, changed, or erased files of interest (in this case spreadsheets), and for new or changed spreadsheets (see FIG. 2) calls the Spreadsheet Analyzer analysis module (310).

The Spreadsheet Analyzer analysis module (310) calls standard, open spreadsheet APIs (for example, Microsoft Excel APIs) (320) to determine spreadsheet details for the spreadsheet's workbook, worksheets, rows, columns, cells, charts, et cetera; the analysis module (310) then adds Spreadsheet Meta-Data detail to the Spreadsheet Meta-Model database (122) (first erasing prior data for the spreadsheet if the spreadsheet is changed rather than new). When done, the analysis module (310) calls the Spreadsheet Analyzer notification module (330).

The Spreadsheet Analyzer notification module (330) generates an e-mail (116) to the most-likely spreadsheet owner (see FIG. 7); the e-mail offers the most-likely file owner (determined via the directory or sub-directory and history of other files found in that directory or sub-directory) the choice of clicking a link to provide more information about the spreadsheet (such as its purpose), suggest another person as the owner, or declare the spreadsheet "private."

If the e-mail (116) recipient clicks a link, doing so automatically starts the Repository Application (130) with the appropriate on-line transaction (see FIG. 6) to add details, reassign ownership, or declare the spreadsheet private.

Figure 4:
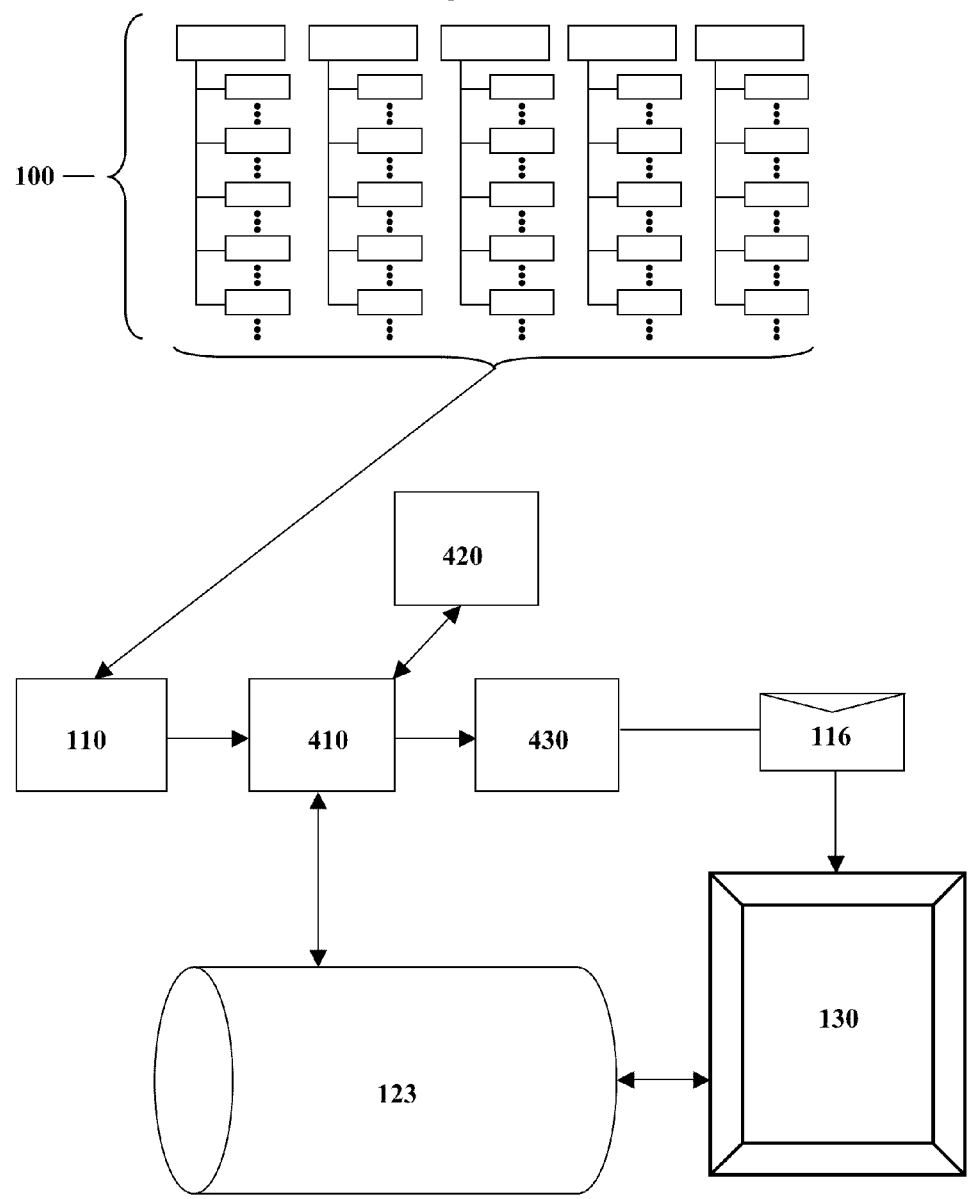
FIG. 4 illustrates logic flow for the Desktop/Departmental Database Analyzer utility.

FIG. 4 illustrates the logic flow of the Database Analyzer utility:

An Enterprise Network (100) contains computers with various files of interesting including desktop/departmental databases.

The "Crawler" (110) utility periodically searches network directories and files for new, changed, or erased files of interest (in this case desktop/departmental databases), and for new or changed desktop/departmental databases calls the Database Analyzer analysis module (410).

The Database Analyzer analysis module (410) calls standard, open desktop/departmental database APIs (such as Microsoft Access APIs) (420) to determine desktop/departmental database details for that database's tables, columns, queries, update transactions, reports, et cetera; the analysis module (410) then adds Database Meta-Data detail to the Database Meta-Model database (123) (first erasing prior data for the desktop/departmental database if the desktop/departmental database is changed rather than new). When done, the analysis module (410) calls the Database Analyzer notification module (430).

The Database Analyzer notification module (430) generates an e-mail (116) to the most-likely desktop/departmental database owner (see FIG. 7); the e-mail offers the most-likely file owner (determined via the directory or sub-directory and history of other files found in that directory or sub-directory) the choice of clicking a link to provide more information about the desktop/departmental database (such as its purpose), suggest another person as the owner, or declare the spreadsheet "private."

If the e-mail (116) recipient clicks a link, doing so automatically starts the Repository Application (130) with the appropriate on-line transaction to add details, reassign ownership, or declare the desktop/departmental database private.

FIGS. 5A-5G list and define Comprehensive Repository (see FIG. 1 (120)) tables and key-table columns, and includes its own summary and narrative details.

FIG. 5A—Table groups (lists of groups of related tables in the Comprehensive Repository database (see FIG. 1 (120)), and FileSystem-group tables (tables that describe an Enterprise Network (see FIG. 1 (100)).

FIG. 5B—FileObject table shows column-level details of this key FileSystem-group table's design, (see FIG. 5A). This table describes a file of interest in an Enterprise Network (see FIG. 1 (100)).

FIG. 5C—Spreadsheet Meta-Model-group tables (tables that describe a spreadsheet (such as an Excel spreadsheet) found in an Enterprise Network (see FIG. 1 (100)).

FIG. 5D—Database Meta-Model-group tables (tables that describe a desktop/departmental application (such as an Access database) found in an Enterprise Network (see FIG. 1 (100)).

FIG. 5E—Database Meta-Model-group tables (continued from FIG. 5D).

FIG. 5F—Simplified Enterprise Applications Meta-Meta-Model-group tables (tables that describe:

Enterprise Development Database (see FIG. 1 (172)) tables and other database objects.

Simple applications synthesized by the Spreadsheet Synthesizer (see FIG. 1 (140)) from spreadsheets such as Excel spreadsheets.

Simple applications synthesized by the Database Synthesizer (see FIG. 1 (142)) from desktop/departmental databases such as Access databases.

FIG. 5G—Enterprise Definition Model (see FIG. 1 (124)) table, describes the structure of one or more organizations, including for example relationships between organizations and staff members and responsibilities held by staff members.

Figure 6:
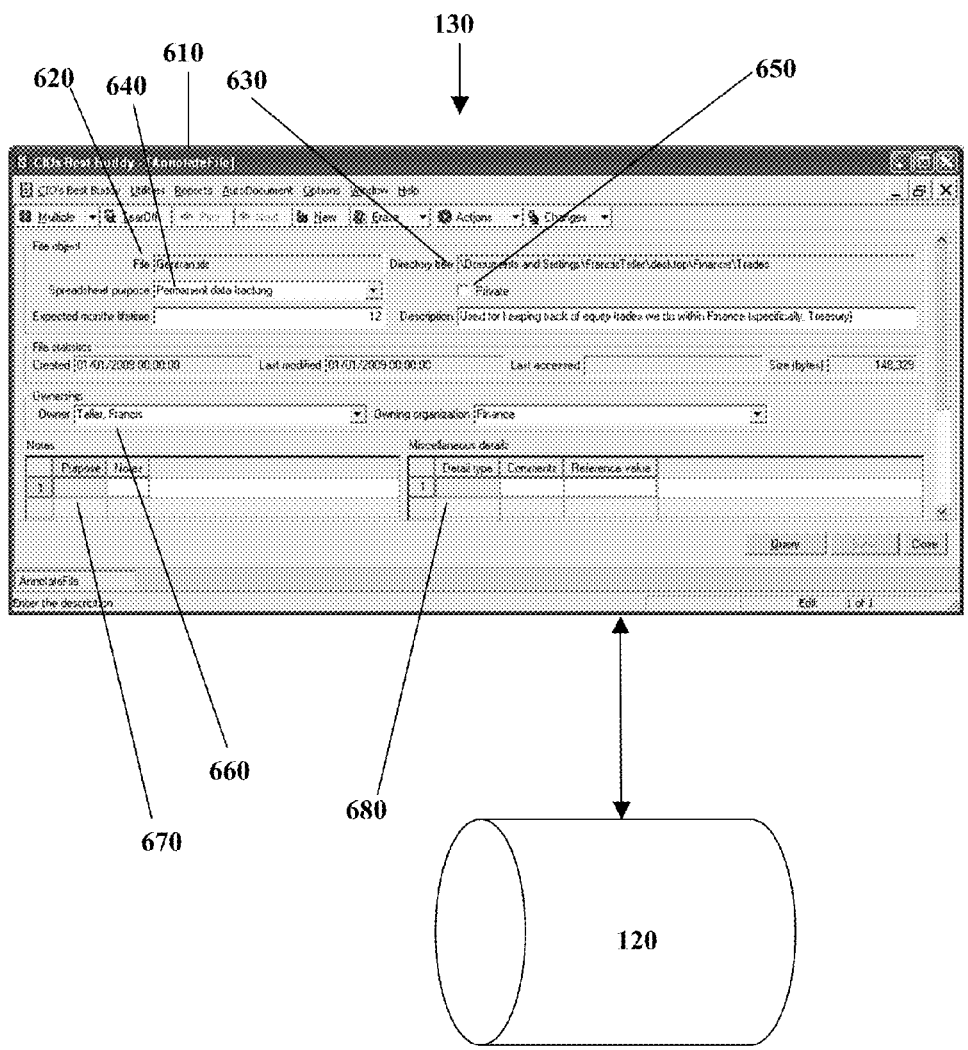
FIG. 6 illustrates a sample screen for the Repository Application.

FIG. 6 is a sample screen-shot of a Repository Application transaction, AnnotateFile:

The Repository Application (130) includes transactions and reports to view and maintain contents of the Comprehensive Repository (120). Once such transaction is the AnnotateFile on-line transaction (610).

The AnnotateFile on-line transaction (610) lets a file owner (in this example, the author of a new spreadsheet) add details, reassign ownership, or declare a file private (i.e., for the use only of the owner).

AnnotateFile (610) shows (and allows changes to) the file's name (620), directory or sub-directory tree (630), primary purpose (640), whether it's private (650), and who is the file's owner (660). In addition, the file's owner can list general-purpose notes (670) and add miscellaneous details (680).

Figure 7:
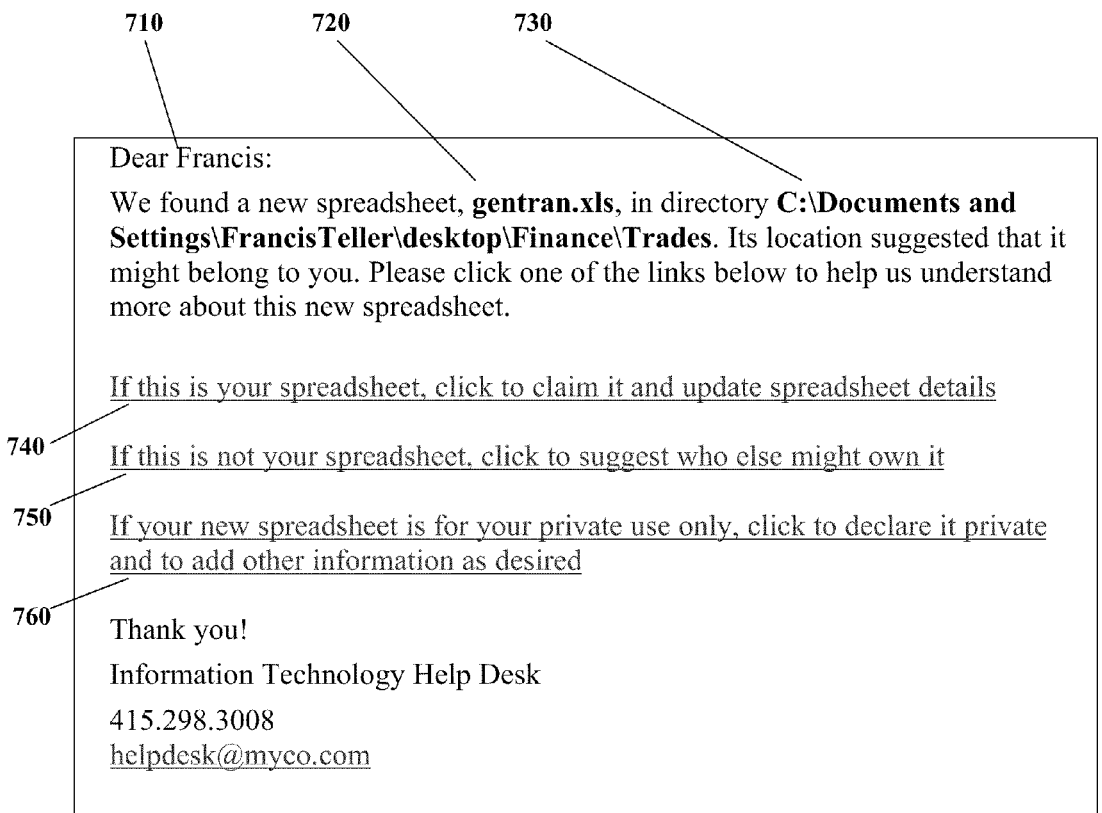
FIG. 7 illustrates a sample e-mail generated by the Spreadsheet Analyzer utility.

FIG. 7 is a sample e-mail generated by the Spreadsheet Analyzer utility:

The Spreadsheet Analyzer utility (112) (see FIG. 1) generates e-mails (116) notifying the most-likely owner of the spreadsheet that it analyzed.

The Database Analyzer utility (114) (also see FIG. 1) generates e-mails (116) notifying the most-likely owner of the desktop/departmental database that it analyzed.

The e-mail's body text specifies the most-likely owner's first name (710), file name in question (720), and disk and directory/sub-directory tree (730).

The e-mail includes a link (740) asking for details about this new spreadsheet; this link's HTML automatically invokes the Repository Application AnnotateFile transaction (see FIG. 6) letting the owner add purpose, et cetera for the spreadsheet.

The e-mail includes a link (750) asking for the recipient's best guess at to the correct owner of this new spreadsheet (i.e., the e-mail recipient turns out not to be the owner but knows who is); this link's HTML automatically invokes the Repository Application ReassignOwners transaction letting the recipient specify who is likely the spreadsheet's owner.

The e-mail includes a link (760) asking for verification that this new spreadsheet is owned by the e-mail's recipient but is private; this link's HTML automatically invokes the Repository Application AnnotateFile transaction letting the owner explicitly state that the spreadsheet is private and add details if desired.

Figure 8:
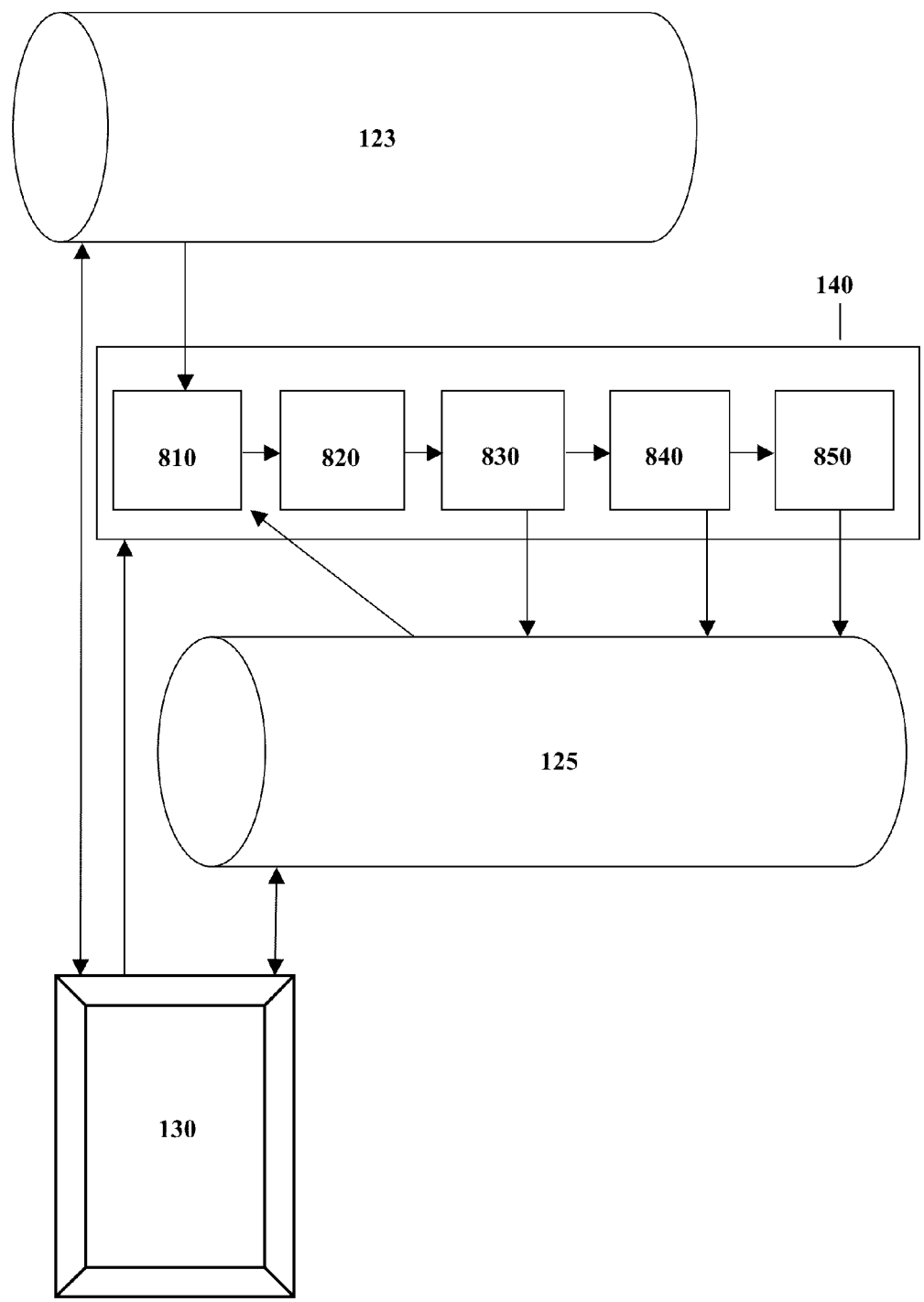
FIG. 8 illustrates logic flow for the Database Synthesis utility.

FIG. 8 illustrates the logic flow of the Database Synthesis utility:

An IT specialist uses the Repository Application (130) to find a desktop/departmental database in the Database Meta-Model database (123) and request running of the Database Synthesis utility (142).

The Database Synthesis utility upload module (810) reads details, including owner-provided annotations and complete desktop/departmental database details (tables, columns, queries, reports, update transactions, et cetera), from the Database Meta-Model database (123), and reads existing applications database details (schemas, tables, columns, et cetera) from the Simplified Enterprise Application Meta-Model database (125).

The Database Synthesis utility synthesis module (820) uses the data gathered by the upload module (810) to determine the most-likely combination of RDBMS tables (already existing and new), new on-line transactions, new reports, et cetera that would replace the original desktop/departmental database. Except for desktop/departmental database-versus-"production"-database transformations, most desktop/departmental database reports become "production" reports and most desktop/departmental database queries, update transactions, et cetera, become "production" on-line transactions capable of updates, queries, et cetera.

The Database Synthesis utility database-design module (830) adds designs for new RDBMS tables, columns, et cetera to the Simplified Enterprise Application Meta-Model database (125).

The Database Synthesis utility transaction-design module (840) adds designs for new transactions (screens, regions, fields, buttons, logic, et cetera) to the Simplified Enterprise Application Meta-Model database (125).

The Database Synthesis utility report-design module (850) adds designs for new reports (titles, headers, footers, regions, fields, buttons, calculations, et cetera) to the Simplified Enterprise Application Meta-Model database (125).

An IT specialist uses the Repository Application (130) to review, fine-tune, or erase the desktop/departmental database's newly created "production" components in the Simplified Enterprise Application Meta-Model database (125).

Figure 9:
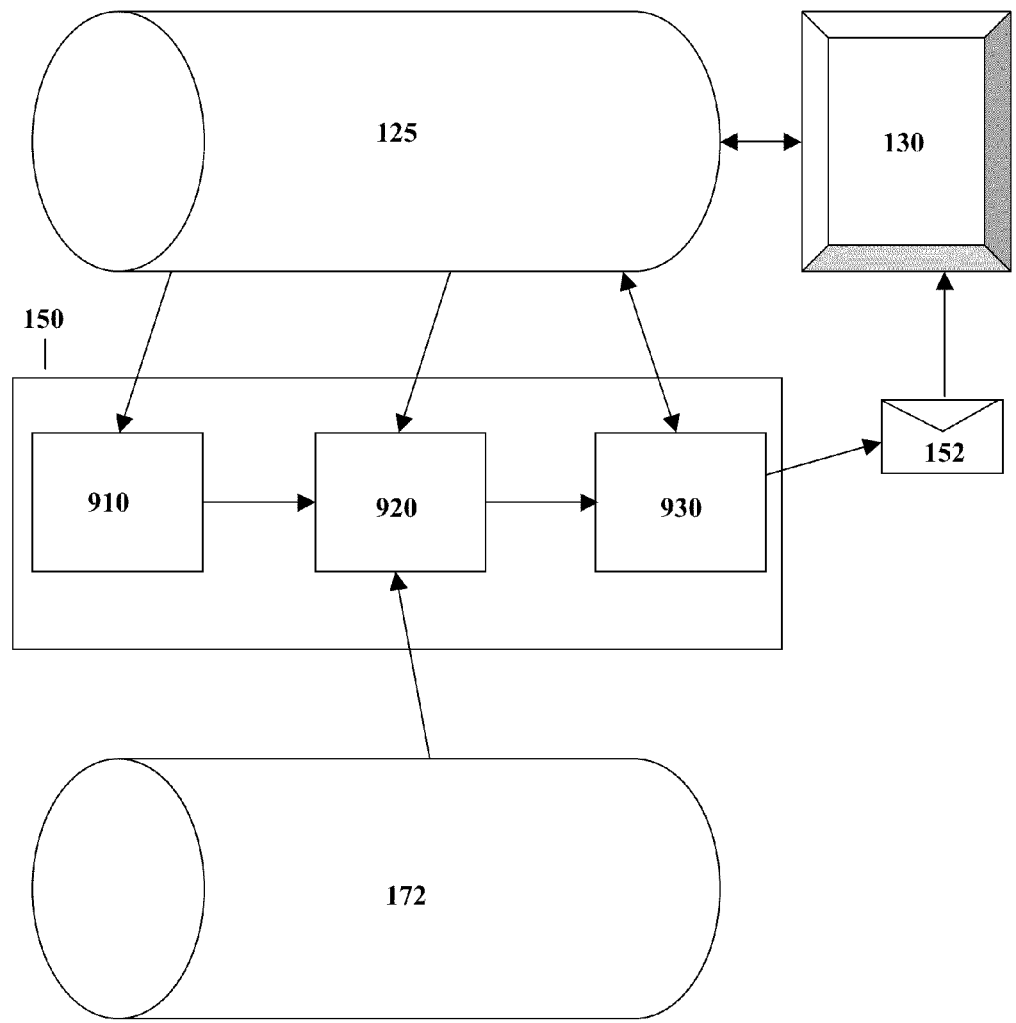
FIG. 9 illustrates logic flow for the Enterprise Database Upload utility.

FIG. 9 illustrates the logic flow of the Enterprise Database Upload utility:

The Enterprise Database Upload utility (150) initiates and runs the Enterprise Database Upload startup module (910), which reads the list of supported and applicable development database instances and schemas from the Simplified Enterprise Application Meta-Model database (125).

The Enterprise Database Upload analysis module (920) reads the list of known development database objects (such as tables and columns) from the Simplified Enterprise Application Meta-Model database (125); reads the active dictionary in the Enterprise Development Database (172) for actual enterprise-database tables, columns, et cetera; and creates a list of differences such as new tables and columns and changed column definitions.

The Enterprise Database Upload differences module (930) reads domain information matching new and changed tables and columns from Simplified Enterprise Application Meta-Model database (125), determines best-guess new meta-meta-model content, updates (adds or modifies) corresponding content in the Simplified Enterprise Application Meta-Model database (125), and where needed generates informative e-mails (152) to responsible IT staff asking for additional information.

When responsible IT staff open generated e-mails (152) and click their links, the Repository Application (130) automatically starts and displays the relevant content-update transaction (for example, TableDetails or ColumnDetails transactions) so that the IT staff member can add specialized information such as suggested column "help text" to display on generated transactions.

Figure 10:
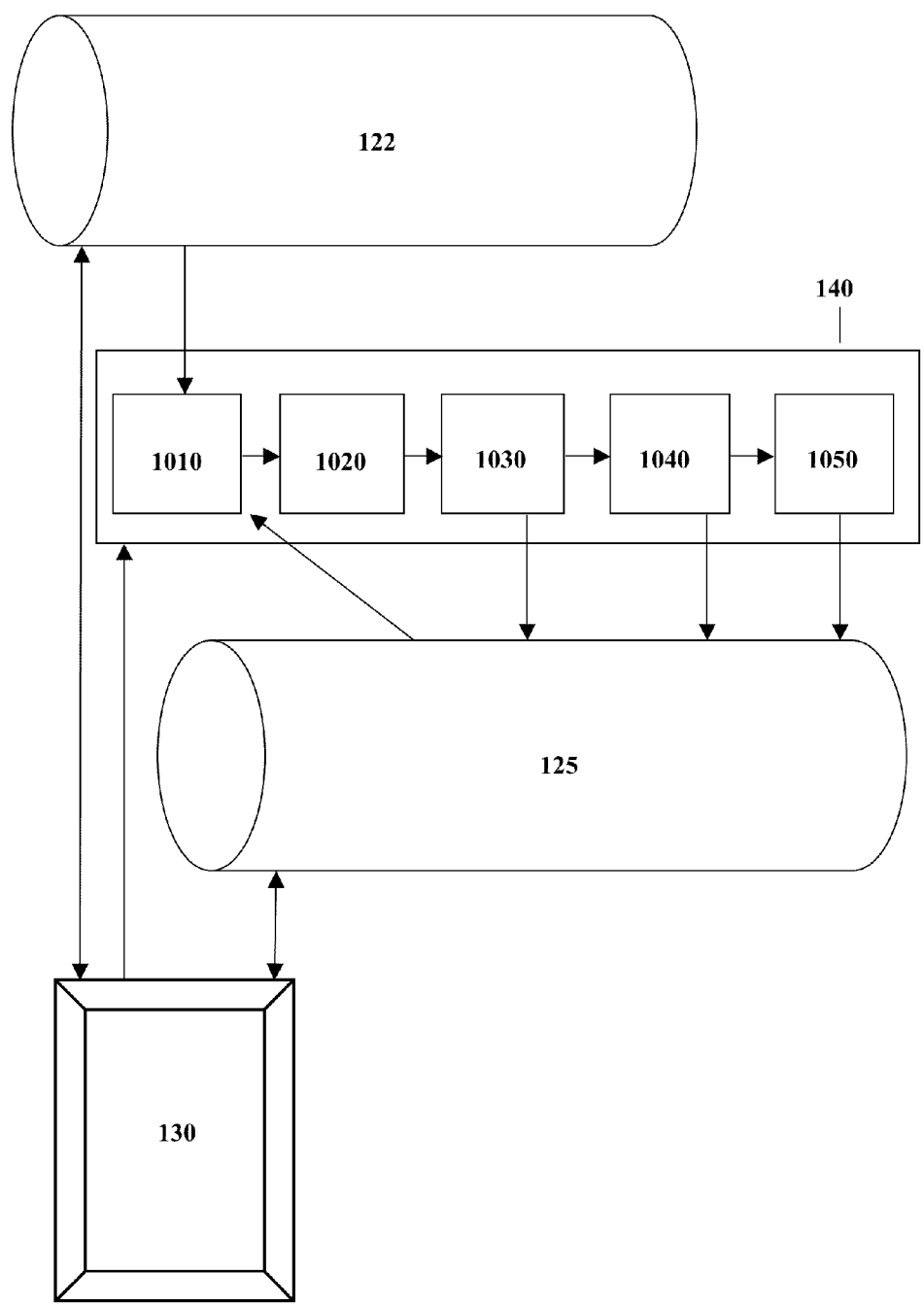
FIG. 10 illustrates logic flow for the Spreadsheet Synthesis utility.

FIG. 10 illustrates the logic flow of the Spreadsheet Synthesis utility (140):

An IT specialist uses the Repository Application (130) to find a spreadsheet in the Spreadsheet Meta-Model database (122) and request running of the Spreadsheet Synthesis utility (140).

The Spreadsheet Synthesis utility upload module (1010) reads details, including owner-provided annotations and complete spreadsheet details (workbook, worksheets, rows, columns, cells, charts, et cetera), from the Spreadsheet Meta-Model database (122), and reads existing applications database details (schemas, tables, columns, et cetera) from the Simplified Enterprise Application Meta-Model database (125).

Figure 11:
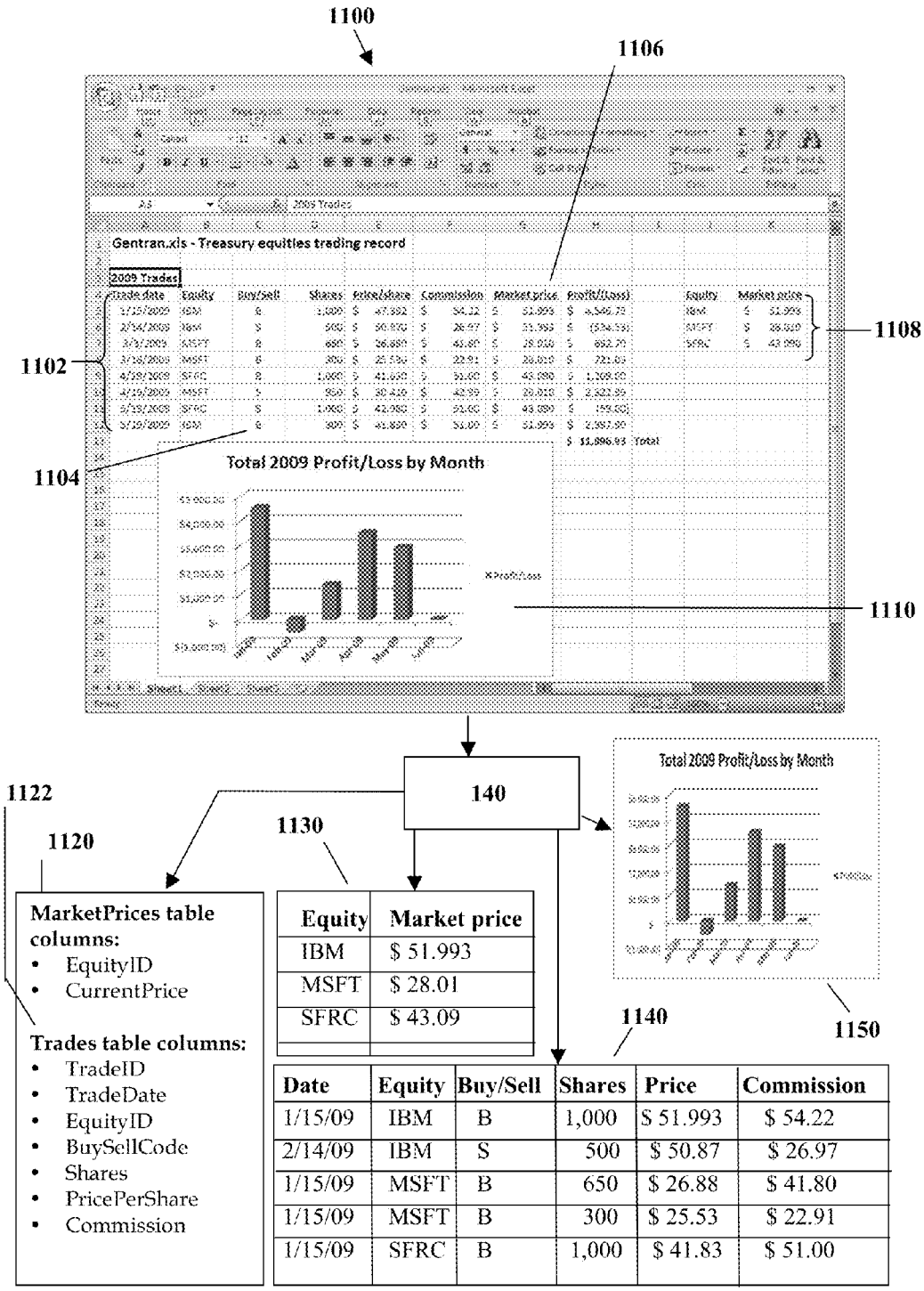
FIG. 11 illustrates an example of the Spreadsheet Synthesis utility "synthesizing" a sample spreadsheet.

The Spreadsheet Synthesis utility synthesis module (1020) uses the data gathered by the upload module (1010) to determine the most-likely combination of RDBMS tables (already existing and new), new on-line transactions, and new reports that would perform the same business function as the original spreadsheet (see FIG. 11).

The Spreadsheet Synthesis utility database-design module (1030) adds designs for new RDBMS tables, columns, et cetera to the Simplified Enterprise Application Meta-Model database (125).

The Spreadsheet Synthesis utility transaction-design module (1040) adds designs for new transactions (screens, regions, fields, buttons, logic, et cetera) to the Simplified Enterprise Application Meta-Model database (125).

The Spreadsheet Synthesis utility report-design module (1050) adds designs for new reports (titles, headers, footers, regions, fields, buttons, calculations, et cetera) to the Simplified Enterprise Application Meta-Model database (125).

An IT specialist uses the Repository Application (130) to review, fine-tune, or erase the spreadsheet's newly created "production" components in the Simplified Enterprise Application Meta-Model database (125).

FIG. 11 shows a sample spreadsheet and illustrates how the Spreadsheet Synthesis utility "synthesizes" the spreadsheet's content into a meta-meta-model of applications database content, on-line transactions, and reports:

A spreadsheet (1100) is analyzed by the Spreadsheet Analyzer utility and placed into the Spreadsheet Meta-Model 122 (see FIG. 3).

The spreadsheet (1100) has a table listing trades (1102); in this table in particular there is a Buy/Sell column (1104) with values of B for Buy and S for Sell, and a Market price column (1106) whose value is derived (copied) from the corresponding Market price value in the Equity table (1108).

The spreadsheet (1100) has a table (1108) listing equities and their (current) market prices.

The spreadsheet (1100) has a chart (1110) summarizing profit or loss by calendar month.

The Spreadsheet Synthesizer (140) reviews complete analyzed spreadsheet content and already existing tables (including, in this case, an already-existing Equities table with columns EquityID and EquityCode) in the Enterprise Simplified Enterprise Application Meta-Model database (125) (see FIG. 10).

The Spreadsheet Synthesizer (140) defines in the Enterprise Simplified Enterprise Application Meta-Model database (see FIG. 10) two new tables (MarketPrices (1120) with a foreign key to the already existing Equities table and Trades (1122) with foreign keys both to Equities and MarketPrices.

The Spreadsheet Synthesizer (140) defines in the Enterprise Simplified Enterprise Application Meta-Model database (see FIG. 10) two new on-line transactions (MaintainMarketPrices (1130) with fields Equity and Market price, and EnterTrades (1140) with fields Date, Equity, Buy/Sell, Shares, Price, and Commission).

The Spreadsheet Synthesizer (140) defines in the Enterprise Simplified Enterprise Application Meta-Model database (see FIG. 10) a charting report (1150) summarizing profit and loss by calendar month. In one or more embodiments, defining the above objects for example adds rows to the following tables (see FIG. 5F): DataObject, DataObjectRelationship, EnterpriseApplication, EnterpriseApplicationObject, EnterpriseApplicationObjectEvent, EnterpriseApplicationObjectMiscellaneousDetail, EnterpriseApplicationObjectNote, EnterpriseDomain, FunctionObject, FunctionObjectInvocation, FunctionObjectInvocationParameter, FunctionObjectParameter, InterfaceObject, InterfaceObjectRelationship, MenuObject, and MenuObjectDetail. Although these field names in the table are provided in an exemplary manner, one skilled in the art will recognize that variations of these names or fields are in keeping with the spirit of the invention so long as the spreadsheet synthesizer (140) can describe the information that it is supplied with in a manner that allows for the description of objects in the Enterprise Simplified Enterprise Application Meta-Model database. The same holds true with any synthesizer component implemented with embodiments of the invention including the database synthesizer for example.

Figure 12:
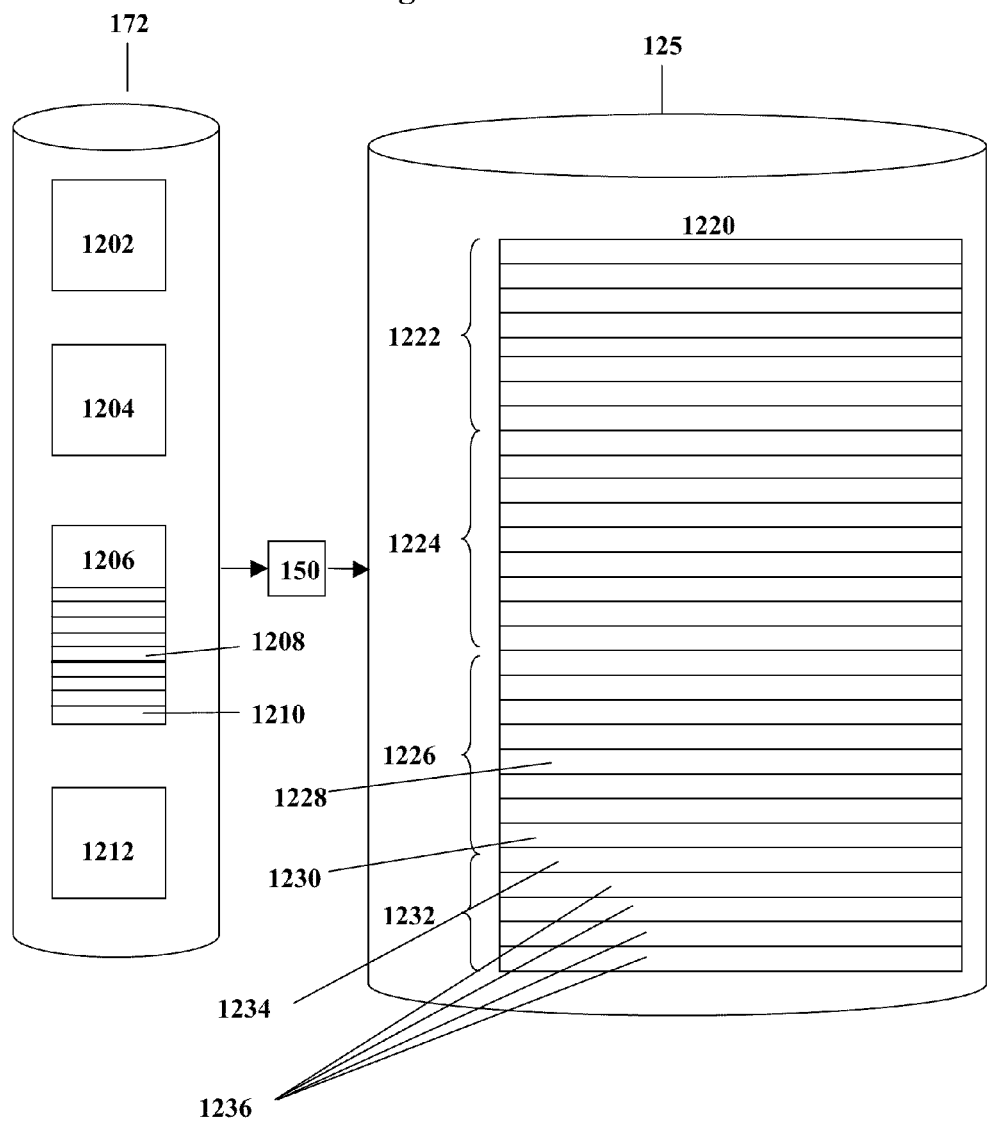
FIG. 12 illustrates Sample Enterprise Simplified Enterprise Application Meta-Model content before and after running the Enterprise Database Upload utility.

FIG. 12 shows sample Enterprise Simplified Enterprise Application Meta-Model (part of the Comprehensive Repository) content after running the Enterprise Database Upload utility:

The Enterprise Development Database (172) shows a schema with three preexisting tables (1202, 1204, and 1206).

In one table (1206), a database administrator or developer has modified one column (1208) and added another column (1210).

A database administrator or developer has added a new table (1212) with four columns.

When the Enterprise Database Upload utility (150) next runs, it compares Enterprise Development Database (172) tables and columns with details in the Simplified Enterprise Application Meta-Model (125) DataObject table (1220).

Since two development tables (1202 and 1204) are unchanged, the Enterprise Database Upload utility (150) leaves their corresponding data (1222 and 1224) in the DataObject table (1220) unchanged.

Since one development table (1206) has a changed column (1208) and a new column (1210), the Enterprise Database Upload utility (150) updates the corresponding detail row (1228) in the DataObject table (1220) for the changed column (1208) and adds a new column-definition row (1230) for the new column (1210).

Since one development table (1212) has been added with four columns, the Enterprise Database Upload utility (150) adds one new table-definition row (1234) and four new column-definition rows (1236) to corresponding data 1232 that corresponds to table 1212.

Figure 13:
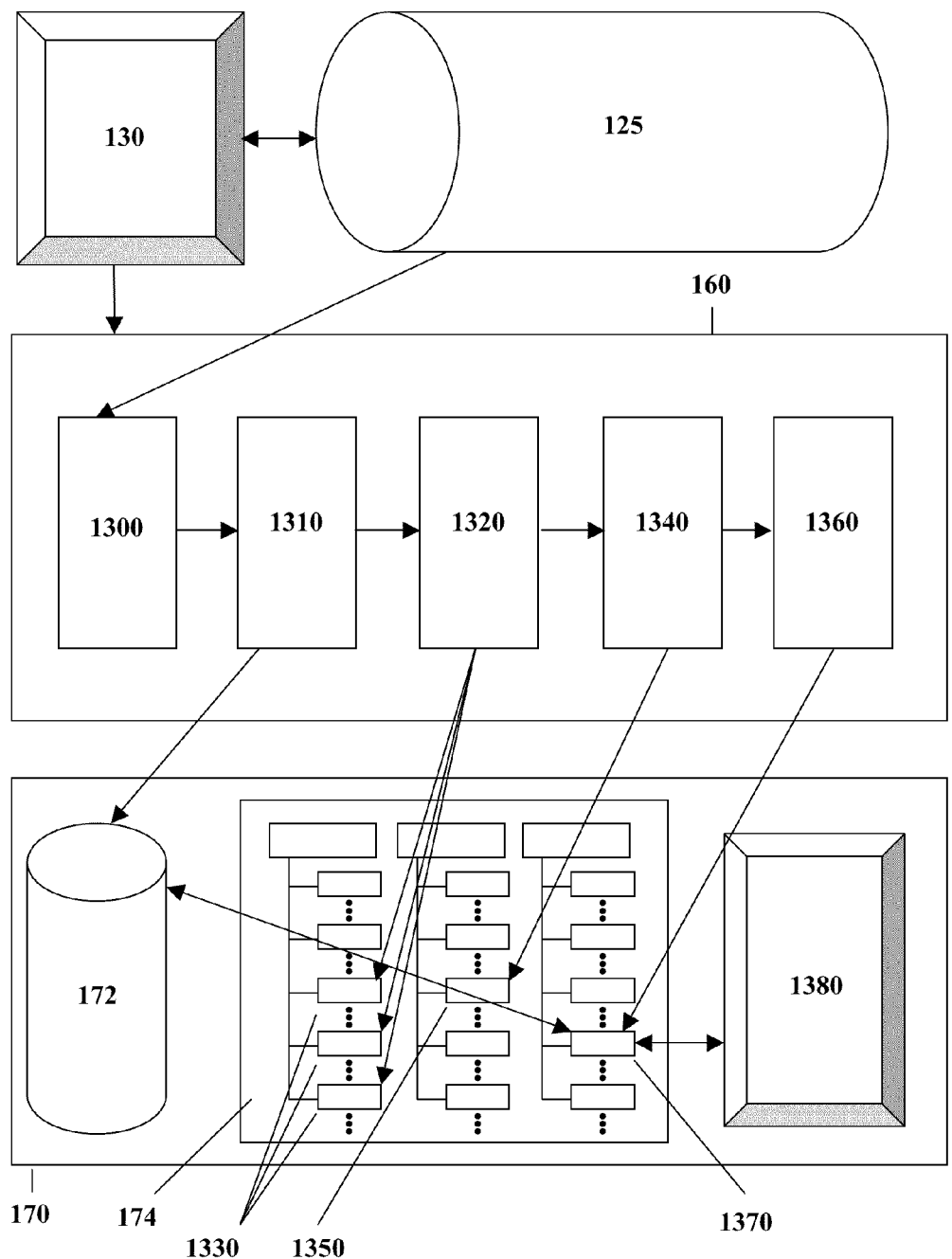
FIG. 13 illustrates logic flow for the Enterprise Applications Generator utility.

FIG. 13 illustrates the logic flow of the Enterprise Applications Generator utility:

An IT specialist uses the Repository Application (130) to find an "application" (originating as either a spreadsheet or desktop/departmental database) in the Simplified Enterprise Application Meta-Model (125) and run the Enterprise Applications Generator utility (160).

The Enterprise Applications Generator content module (1300) reads the Simplified Enterprise Application Meta-Model (125) for new and changed applications content (tables, columns, transactions, reports, et cetera).

The Enterprise Applications Generator database module (1310) generates and runs DDL (SQL Data-Definition Language) and DML (SQL Data-Manipulation Language) to add new tables, add new columns to existing tables, and convert tables with changed columns as necessary, then runs that DDL and DML in the Development Database (172) in the Enterprise Development Run-Time Environment (170). One skilled in the art will recognize that any type of database language or commands associated with a given database language can be utilized so long as the desired tables and columns are created, modified or deleted as desired.

The Enterprise Applications Generator transaction module (1320) generates (depending on site standards) enterprise business objects such as J2EE EJB's, .NET objects, et cetera programmatic/source code for all new transactions implied by the underlying spreadsheet or desktop/departmental database, and adds them into various source files (1330) in the Development File System (174) within the Enterprise Development Run-Time Environment (170).

The Enterprise Applications Generator report module (1340) generates (depending on site standards) Crystal, Excel, et cetera programmatic/source code for all new reports implied by the underlying spreadsheet or desktop/departmental database, and adds them into various other source files (1350) in the Development File System (174) within the Enterprise Development Run-Time Environment (170).

The Enterprise Applications Generator invocation module (1360) compiles transaction and report programmatic/source code for all new reports and transactions, creates run-time or executable files (1370), adds them into various files in the Development File System (174) within the Enterprise Development Run-Time Environment (170), then invokes or executes those run-time or executable files (1370) to run the resulting application (1380).

While the invention herein disclosed has been described by means of specific embodiments and applications thereof, numerous modifications and variations could be made thereto by those skilled in the art without departing from the scope of the invention set forth in the claims.

What is claimed is:

1. A system for management of common decentralized applications data and logic comprising:
   a file-system repository that lists each file of interest and describes design and intent information for each at least one spreadsheet and at least one desktop/departmental database hosted in an enterprise network comprising one or more computers;
   a spreadsheet meta-model repository configured to hold meta-data for each of the at least one spreadsheet;
   a database meta-model repository configured to hold meta-data for each of the at least one desktop/departmental database;
   a simplified enterprise application repository configured to store descriptions of simple enterprise applications;
   an enterprise development repository configured to hold enterprise database meta-data;
   said file-system repository, said spreadsheet meta-model repository, said database meta-model repository, said simplified enterprise application repository and said enterprise development repository configured to execute on at least one computer configured to be coupled with said enterprise network;
   a repository application configured to manage at least the file-system repository and simplified enterprise application repository;
   a crawler module configured to search directories on said enterprise network for new, changed and deleted/erased files of interest and keep the file-system repository complete and up to date;
   a spreadsheet analyzer module configured to obtain new, changed or erased spreadsheets from the crawler module and read semantic details from the spreadsheets and store changes into the spreadsheet meta-model repository;
   a spreadsheet synthesis module configured to analyze on demand a spreadsheet in the spreadsheet meta-model repository and restate each spreadsheet as a simple enterprise application in the simplified enterprise application repository;
   a database analyzer module configured to obtain new, changed or erased databases from the crawler module and read semantic details from the databases and store changes into the database meta-model repository;
   a database synthesis module configured to analyze on demand a desktop/departmental database in the database meta-model repository and restate each desktop/departmental database as a simple enterprise application in the simplified enterprise application repository;
   an email module configured to send an email to a file owner and query the file owner about the at least one spreadsheet and/or at least one desktop/departmental database purpose and store an answer to the query in the file-system repository;
   an enterprise database upload module configured to read the enterprise development database and store the enterprise database meta-data in the simplified enterprise application repository;
   an enterprise application generator module configured to generate, in at least one development technology stack, well-programmed enterprise relational databases and applications in the enterprise development repository based on descriptions of the simple enterprise applications in the simplified enterprise application repository; and,
   wherein said repository application, said crawler module, said spreadsheet analyzer module, said spreadsheet synthesis module, said database analyzer module, said database synthesis module, said email module, said enterprise database upload module and said enterprise application generator module are configured to execute on the at least one computer configured to be coupled with said enterprise network.

2. The system of claim 1 wherein said Crawler module is further configured to read a list of file extensions from the file-system repository and find databases and spreadsheets of interest associated with the file extensions.

3. The system of claim 1 wherein said Crawler module is further configured to read a list of domains, servers, disks and directories for which to perform a search.

4. The system of claim 1 wherein said Crawler module is further configured to verify continued existence of each to-be-searched domain, server and disk and find files that no longer exist and erase all references for each of the files that no longer exist from the file-system repository and if a spreadsheet erase all references from the spreadsheet meta-model and if a desktop/departmental database erase all references from the desktop/departmental database meta-model.

5. The system of claim 1 wherein said Crawler module is further configured to find all directories and sub-directories and compare the directories and sub-directories to those already known in the file-system repository and add new directory and sub-directory records to the file-system repository and mark any directories and sub-directories as missing if the directories and sub-directories are no longer available.

6. The system of claim 1 wherein said Crawler module is further configured to find changed files in the directories and sub-directories and update the file-system repository and for files that have changed, call the spreadsheet analyzer module or the database analyzer module based on a file type associated with the changed files.

7. The system of claim 1 wherein said spreadsheet analyzer module is configured to call an application programming interface to determine spreadsheet details associated with said at least one spreadsheet and add spreadsheet meta-data detail to the spreadsheet meta-model repository based thereon.

8. The system of claim 1 wherein said database analyzer module is configured to call an application programming interface to determine database details associated with said at least one desktop/departmental database and add database meta-data detail to the desktop/departmental meta-model repository based thereon.

9. The system of claim 1 wherein said email module generates the email with a link in the email that signifies an actual owner of the at least one spreadsheet and/or at least one desktop/departmental database.

10. The system of claim 1 wherein said email module generates the email with a link in the email that signifies that the at least one spreadsheet and/or at least one desktop/departmental database is private.

11. The system of claim 1 wherein said database synthesis module reads owner provided annotations and database details including tables, columns, queries and reports from the database meta-model repository and reads existing applications database details including schemas from the simplified enterprise application repository and determines the most-likely combination of relational database management system tables to replace the original at least one desktop/departmental database.

12. The system of claim 1 wherein said database synthesis module adds designs for new tables and columns, new transactions and new reports to the simplified enterprise application repository.

13. The system of claim 1 wherein said enterprise database upload module reads a list of supported and applicable development database instances and schemas from the simplified enterprise application repository.

14. The system of claim 1 wherein said enterprise database upload module reads a list of known development database objects including tables and columns from the simplified enterprise application repository and reads an active dictionary in the enterprise development database for actual enterprise-database tables and columns and creates a list of differences including new tables and new columns and changed tables and changed columns.

15. The system of claim 1 wherein said enterprise database upload module reads domain information that matches new and changed tables and columns from the simplified enterprise application repository and determines new meta-meta-model content and updates corresponding content in the simplified enterprise application repository.

16. The system of claim 1 wherein said enterprise database upload module generates an informative email to query for additional information.

17. The system of claim 1 wherein said spreadsheet synthesis module reads owner provided annotations and spreadsheet details including workbooks, worksheets, rows, columns, cells and charts from the spreadsheet meta-model repository and reads existing applications database details including schemas from the simplified enterprise application repository and determines the most-likely combination of relational database management system tables, on-line transactions and reports to perform a same business function as an original spreadsheet.

18. The system of claim 1 wherein said spreadsheet synthesis module adds designs for new tables and columns, new transactions and new reports to the simplified enterprise application repository.

19. The system of claim 1 wherein said enterprise application generator module reads the simplified enterprise application repository and generates structured query language data-definition language and data-manipulation language statements to add new tables and new columns to existing tables and convert tables with changed columns and run the structured query language data-definition language and data-manipulation language statements in the enterprise development repository.

20. The system of claim 1 wherein said enterprise application generator module generates enterprise business objects for all new transactions implied by the underlying spreadsheet or desktop/departmental database and adds the enterprise business objects to a development file system.

* * * * *